US006278204B1

United States Patent
Frenette

(10) Patent No.: US 6,278,204 B1
(45) Date of Patent: Aug. 21, 2001

(54) METHOD OF CONVERTING INTERNAL COMBUSTION ENGINE INTO ELECTRICALLY DRIVEN ENGINE

(76) Inventor: Eugene Roland Frenette, 223 Rabbit Rd., Salisbury, NH (US) 03268

(*) Notice: Subject to any disclaimer, the term of this patent is extended or adjusted under 35 U.S.C. 154(b) by 0 days.

(21) Appl. No.: 09/335,929

(22) Filed: Jun. 18, 1999

(51) Int. Cl.[7] ............................. H02K 7/06; H02K 33/00
(52) U.S. Cl. .................................. 310/24; 310/34; 310/35
(58) Field of Search .................................. 310/24, 10, 12, 310/34, 17, 20, 35

(56) References Cited

U.S. PATENT DOCUMENTS

| | | | |
|---|---|---|---|
| 1,349,100 | * 9/1920 | Reynolds | 310/24 |
| 1,436,245 | * 11/1922 | Geisler | 310/24 |
| 1,886,040 | * 11/1932 | Moodyman | 310/24 |
| 3,712,099 | * 1/1973 | Eisbett et al. | 72/107 |
| 4,317,058 | * 2/1982 | Blalock | 310/24 |
| 4,507,579 | 3/1985 | Turner | 310/23 |
| 4,510,420 | * 4/1985 | Sasso | 310/24 |
| 4,631,455 | * 12/1986 | Taishoff | 318/37 |
| 4,684,834 | * 8/1987 | Hartman | 310/24 |
| 5,036,930 | 8/1991 | Bisel et al. | 310/15 |
| 5,219,034 | 6/1993 | Wortham | 310/15 |
| 5,276,372 | * 1/1994 | Hammer | 310/16 |
| 5,457,349 | * 10/1995 | Gifford | 310/24 |
| 5,469,004 | 11/1995 | Jachim | 310/24 |
| 5,592,036 | * 1/1997 | Pino | 310/24 |
| 5,757,093 | 5/1998 | Susliaev et al. | 310/24 |

* cited by examiner

Primary Examiner—Burton S. Mullins
(74) Attorney, Agent, or Firm—Davis & Bujold, P.L.L.C.

(57) ABSTRACT

A method of modifying an internal combustion engine to run on electrical energy. A conventional cylinder head cover of the internal combustion engine is removed and a steel plunger is secured to an end face of each one of the associated pistons. The conventional cylinder head cover is replaced with a modified cylinder head cover which has a solenoid located within each one of the extended cylinder bores, and each solenoid has a central bore for receiving the associated steel plunger. Each solenoid is coupled to a control unit which provides electrical power to each of the solenoids during approximately 180° of rotation of the crankshaft of the engine. The control unit may be a mechanical distributor and relay arrangement or an electronic controller. The pistons work in pairs so that when two of the solenoids are energized, they draw the associated steel plungers within the solenoid central bores while the two remaining solenoids remain de-energized and rotate or reciprocate solely, due to their momentum, to a lower most position. Once the two pistons, associated with the energized solenoids, reach their upper most rotational or reciprocal position, the associated solenoids are de-energized and the other two solenoids are energized. The sequential energization/de-energization of the first and second pairs of solenoids causes the crankshaft to rotate in a desired direction and provide driving output in a conventional manner. The cylinder head cover is provided with an internal coolant cooling system for cooling the solenoids, during operation of the engine, to prevent overheating thereof.

14 Claims, 9 Drawing Sheets

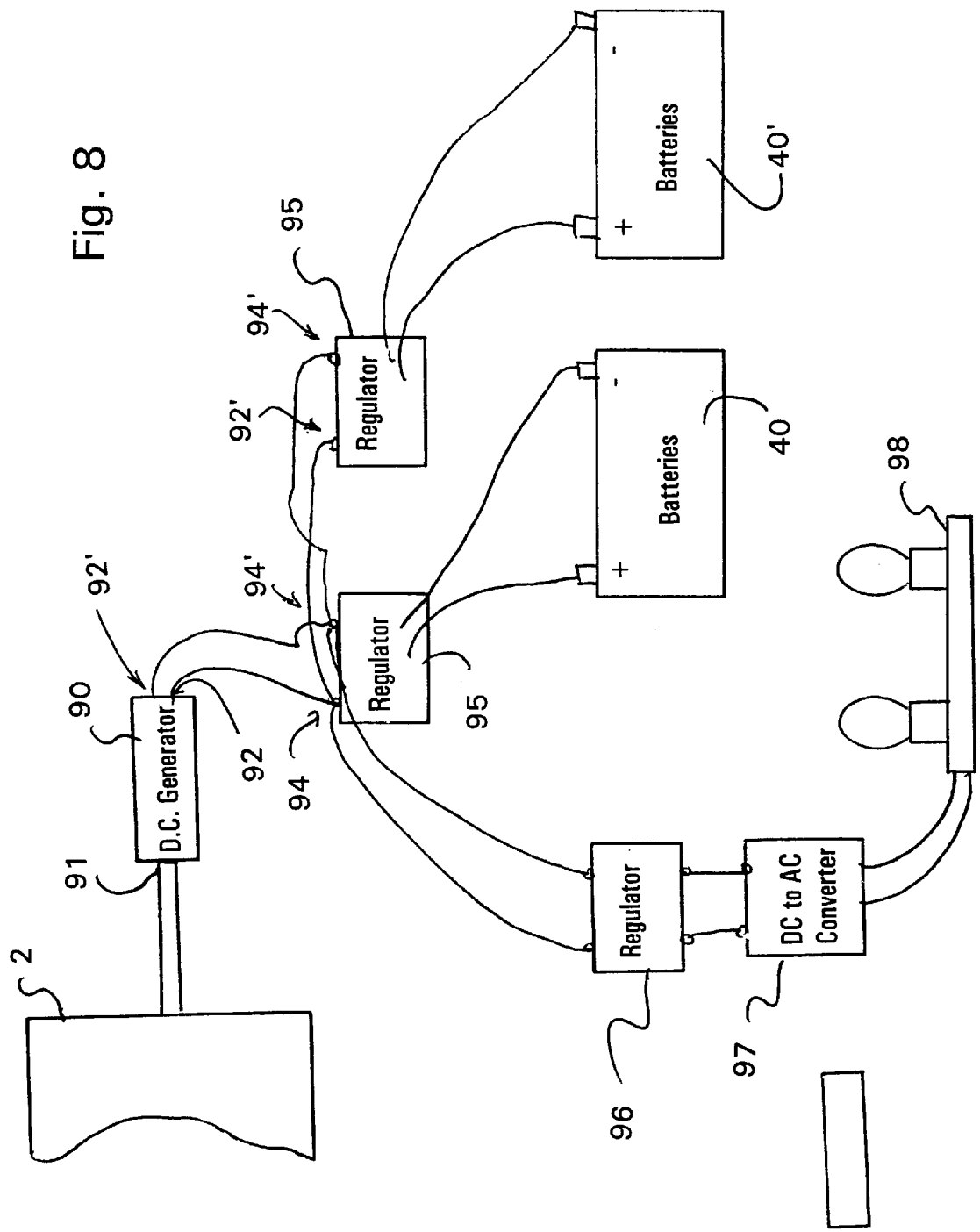

METHOD OF CONVERTING INTERNAL COMBUSTION ENGINE INTO ELECTRICALLY DRIVEN ENGINE

The present invention relates to a method of converting a conventional internal combustion engine, such as a gasoline engine, into an engine which can be driven by electrical energy.

BACKGROUND OF THE INVENTION

There are a variety of engines currently known in the art that can be driven by electrical energy. However, presently none of these known electrical engines facilitate the ready conversion of a conventional internal combustion engine into an electrically driven engine. Moreover, none of these known electrical engine designs are suitable for being provided as a kit of parts which allows the ready conversion of an internal combustion engine into an electrically driven engine.

SUMMARY OF THE INVENTION

Wherefore, it is an object of the present invention to overcome the aforementioned problems and drawbacks associated with the prior art designs of electrical engines.

A further object of the invention is to facilitate easy conversion of a conventional internal combustion engine, such as a gasoline engine, into an engine which can be driven by electricity.

Yet another object of the invention is to provide a kit of modification components which can be readily attached to a conventional internal combustion engine to facilitate conversion of the conventional internal combustion engine into an electrically driven engine via minor modifications to the engine.

A further object of the invention is to provide a modified rotor which sequentially electrically powers a first pair of associated solenoids and pistons for approximately 180° of the rotation of the crankshaft and then sequentially electrically powers a second pair of associated solenoids and pistons for the remaining 180° of the rotation of the crankshaft.

To meet these and other objectives, the present invention discloses a method for converting an internal combustion engine into an electrically driven engine. To this end, a cylinder head cover of the engine is removed, revealing the top surfaces of the engine piston heads. A cylindrical steel plunger is affixed to each piston head, preferably via a self-centering, semi-flexible coupling. The cylinder head cover is replaced with a modified cylinder head cover having a plurality of cylindrical cavities disposed therein equal in number to the number of engine cylinders. A solenoid having a central, cylindrical solenoid bore is disposed in each cylindrical head cover cavity. Each steel plunger extends into a different one of the solenoid bores.

Subsequently, two twelve volt batteries and a control unit are provided. The control unit is electrically connected to the solenoids, and, according to a timing scheme, sequentially activates the solenoids in pairs. When a pair of solenoids is activated, each draws in (or pushes out) its respective steel plunger via a generated magnetic field, moving an associated piston and turning an engine crankshaft. The timing scheme may be implemented by a mechanical distributor or an electronic controller.

The present invention relates to a method of modifying an internal combustion engine having a plurality of cylindrical bores each housing a movable piston therein, each piston being pivotally coupled, by a connecting rod, to a rotatable crankshaft, and the crankshaft suppling an output of the engine, the method comprising the steps of: removing a cylinder head cover of the engine to provide access to each of the pistons; mounting a steel plunger to an end face of each one of the pistons located within a cylinder bore; attaching a modified cylinder head cover having an extended cylinder bore accommodating a solenoid therein, and each solenoid having a central bore for receiving therein one of the mounted steel plungers when each associated solenoid is energized with electrical power; and supplying, via a control member, electrical energy to the solenoids, in a desired sequence, to cause each associated steel plunger to be received within the central bore of the associated solenoid and thereby induce rotational driving of the crankshaft.

The present invention also relates to a engine having a plurality of cylindrical bores each housing a movable piston therein, each piston being pivotally coupled, by a connecting rod, to a rotatable crankshaft, and the crankshaft suppling an output of the engine, the engine comprising: a steel plunger mounted to each end face of each one of the pistons located within a cylinder bore; a modified cylinder head cover having an extended cylinder bore with each extended cylinder bore accommodating a solenoid therein, and each solenoid having a central bore for receiving therein one of the mounted steel plungers when each associated solenoid is energized with electrical power; and control member for selectively supplying electrical energy to each one of the solenoids, in a desired sequence, to cause each associated steel plunger to be received within the central bore of the associated solenoid, according to a desired timing sequence, and thereby induce rotational driving of the crankshaft to provide an output drive of the engine.

BRIEF DESCRIPTION OF THE DRAWINGS

The present invention will now be described, by way of example, with reference to the accompanying drawings in which:

FIG. 8 is a diagrammatic representation showing one embodiment for utilizing the output of the internal combustion engine.

DESCRIPTION OF THE PREFERRED EMBODIMENT(S)

Figure 1:
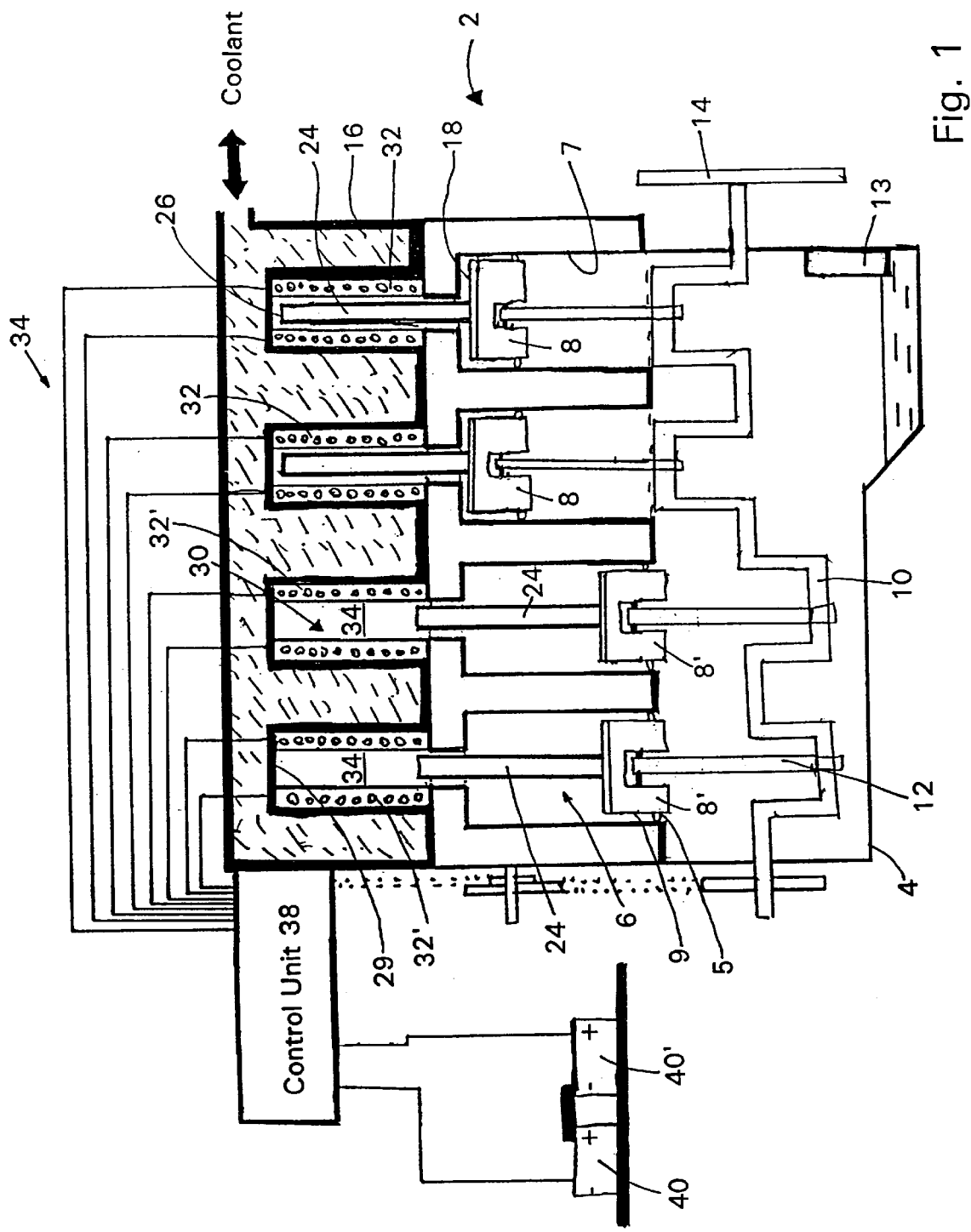
FIG. 1 is a diagrammatic representation showing a modified internal combustion engine according to the present invention.

Turning now to FIG. 1, a detailed description concerning basic components of a conventional internal combustion engine as well as the components for modifying the internal combustion engine to facilitate conversion into an electrical driven engine will now be provided. As can be seen in this Figure, the internal combustion engine 2 comprises an engine block, generally designated as 4, which has a desired number of cylinder bores 6 formed therein, e.g. in this Figure there are four cylinder bores. Each cylinder bore 6 has an inwardly facing cylindrical surface 7 which is sized to have a close sliding fit with a mating outwardly facing surface 9 of a mating piston 8, 8'. Each piston 8, 8' typically has a spring biased lower annular oil ring 5 which is positioned between the outwardly facing surface 9 of the piston 8, 8' and the inwardly facing surface 7 of the cylinder bore 6. The oil rings 5 slide against the inwardly facing surfaces 7 of the cylinder bores 6 as the pistons 8, 8' move to and fro within the cylinder bores 6 during operation of the engine 2 and separate the oil in the engine from a top portion of the cylinder bores 6.

A lower portion of each piston 8, 8' is pivotably connected to a central crankshaft 10 by a connecting rod 12, in a conventional manner, as is well known in the art. The central crankshaft 10 supplies output driving power for the engine 2 to a drive shaft (not shown in detail), for example, in a conventional manner. In an analogous fashion, each one of the four pistons 8, 8' is similarly connected with the crankshaft 10, at a desired spaced location along the crankshaft 10, by an associated connecting rod 12. It is to be further noted that the first pair of adjacent pistons 8 (see the two pistons located on the right in FIG. 1) work in combination with one another while the second pair of adjacent pistons 8' (see the two pistons located on the left in FIG. 1) work in combination with one another and a further detailed description concerning the combined operation of the first and second plurality or pair of pistons will be provided below.

The crankshaft 10 is coupled to a fly wheel 14, in a conventional manner. to provide the initial rotation to the crankshaft 10 upon starting the engine 2. The conventional internal combustion engine 2 is also provided with an internal oil pump 13 (only diagrammatically shown) which communicates with lubricating oil located in the bottom portion of the oil pan. The oil pump supplies the oil to the moving components of the internal combustion engine to keep those components sufficiently lubricated during operation of the engine, as is conventionally done in the art. As such teaching is well known in the art, a further detailed discussion concerning the same is not provided.

Now that the basic components of the internal combustion engine have been briefly described, a detailed description concerning modification of the engine 2, according to the teaching of the present invention, will now be provided. The process for converting an internal combustion engine into an electrical engine is straightforward and generally comprises removing the original cylinder head cover and replacing the same with a modified cylinder head cover 16, according to the present invention, upon completion of the other modifications to the engine 2 discussed below. Once the original conventional cylinder head cover is removed, access to a top surface 18 of each one of the pistons 8, 8' is readily available. A bolt (not shown in detail), which secures the piston 8, 8' to a first end of its respective connecting rod 12, is generally accessible. The bolt is removed from a threaded bore provided in the top first surface 18 of the piston 8, 8'. A new, longer bolt, e.g. a bolt having a combined axial length as long as the axial length of a desired cylindrical steel plunger 24 plus the axial length of the original bolt, is utilized for attaching the cylindrical steel plunger 24 to the top first surface 18 of each one of the respective pistons 8, 8'. Each steel plunger 24 has a central bore extending therethrough which is sized to allow the new longer bolt to readily pass therethrough and secure the steel plunger to the piston 8, 8'. Alternatively, the plungers 24 may be affixed to the pistons 8, 8' in a manner described below with reference to FIG. 5.

Each cylindrical steel plunger 24 typically has an axial length of between 2 inches and about 6 inches and a diameter of between about one-half inch and about 6 inches, so that when the modified cylinder head cover 16 is attached to the engine 2, in a conventional manner, and the piston 8, 8' is located in its upper most rotational position (see the position of the two pistons 8 on the right shown in FIG. 1) an end face 26 of the cylindrical steel plunger 24 will be located closely adjacent but slightly spaced from an end surface 29 of an extended cylinder cavity 30 formed in the modified cylinder head cover 16. It is to be appreciated that each one of the pistons 8, 8' is similarly coupled to a cylindrical steel plunger 24 and moves in and out of an associated extended cylinder cavity 30.

A first modification of the internal combustion engine relates to the pistons 8, 8'. Each one of the pistons 8, 8' of an internal combustion engine typically has a spring biased annular compression ring and an oil ring (not shown in detail). As the annular compression rings are not required in an electrical engine, they can be removed during conversion of the engine from an internal combustion engine to an electrical engine to reduce the friction between the pistons 8, 8' and the cylinder bores 6 during operation. The oil rings remain to facilitate the lubrication of the pistons within the cylinder bores.

A mating solenoid 32, 32' is supported within each extended cylinder cavity 30 formed in the modified cylinder head cover 16. Each solenoid 32, 32' is provided with a central cylindrical bore 34 aligned for receiving a respective one of the cylindrical steel plungers 24 upon activation of the solenoids 32, and a further discussion concerning the function of the same will follow. It is to be appreciated that the outwardly facing surface of each steel plunger 24 must have a clearance fit of between about 0.010 inch and about 0.020 inch with the central cylindrical bore 34 formed within each solenoid 32, 32'. This clearance allows unrestricted and/or uninhibited to and fro movement of each steel plunger 24 within its respective cylindrical bore 34 as the pistons 8, 8' move up and down during their normal rotational or reciprocal movement.

Due to the generation of heat during operation of the solenoids 32, 32', it is necessary for the modified cylinder head cover 16 to be sufficiently cooled by a supply of coolant, e.g. by water or a combination of water and antifreeze, to prevent the solenoids 32,32' from overheating. It is to be appreciated that the supplied coolant, for cooling the solenoids 32, 32', can be coupled to the normal coolant system of the internal combustion engine 2 and cycled through the engine and the radiator in a conventional fashion for suitable cooling. Alternatively, the coolant for the cylinder head cover 16 may be a completely closed system which is totally separate from the normal coolant system of the internal combustion engine. For example, each extended cylinder cavity may be surrounded by a cavity containing a sufficient quantity of cooling fluid which does not flow but merely conveys the generated heat to the exterior surface of the modified cylinder head cover 16 where the heat is dissipated. As the present invention does not relate to the specific connection of a coolant system, for cooling the solenoids 32, 32', with the remainder of the coolant system of the internal combustion engine, a further detailed description concerning is not provided.

For electrical control of the modified engine of the present invention, each solenoid 32,32' is electrically coupled by wires 34, in a conventional manner, to a control unit 38, which may include a modified distributor, a throttle control, or the like.

Figure 2:
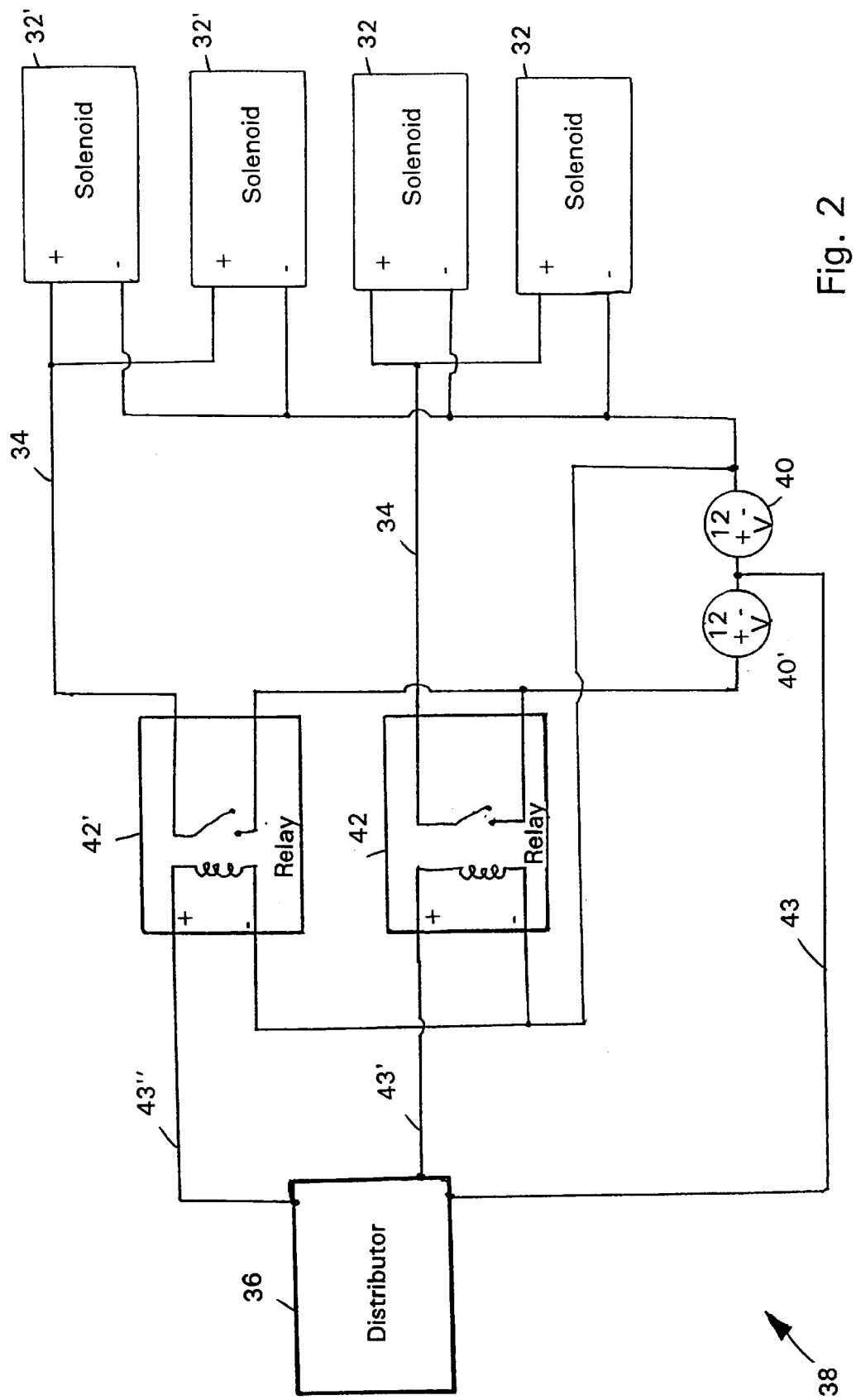
FIG. 2 is a schematic diagram of a control unit circuit for controlling the modified internal combustion engine.

As show in FIG. 2, one suitable control unit 38 comprises a first conventional twelve volt battery 40 and a second twelve volt battery 40' connected in series to provide a maximum output voltage of 24 volts. This output is connected to a switch input of both a first and second twelve volt normally open switch relay 42, 42'. The switch of each relay 42, 42' is electrically connected, via wire 34, to the positive inputs of two of the solenoids 32, 32', respectively. In this embodiment, the solenoids 32, 32' are rated for 24 volts, e.g. they provide a substantial electromagnetic force for moving the plungers 24 when a 24 volt connection(or thereabouts, e.g. two batteries 40, 40' connected in series) is established across the solenoid input terminals.

Each solenoid 32, 32' is actuated when its respective relay 42, 42' is closed to provide a 24 volt connection. The relays 42,42', in turn, are controlled according to a timing scheme implemented in a control member or distributor 36, which receives a 12 volt input from the first battery 40 via a line 43 and provides the supplied voltage, according to the timing scheme, either to a first output line 43' or to a second output line 43". The output lines 43', 43" are electrically connected to the positive relay solenoid input terminals of the relays 42, 42', respectively. Here, as mentioned, the switches of the relays 42, 42' close when the twelve volt connection is established across the relay solenoid terminals. Alternatively, the relays 42, 42' may be twenty-four volt relays, with the voltage supplied to the distributor being a corresponding 24 volts.

Examples of suitable distributors 36 according to the present invention, and timing schemes associated therewith, are shown in FIGS. 3A–5C. The general control scheme, according to the present invention, is to sequentially activate each pair of solenoids 32, 32' once every cycle (e.g. a 360° rotation of the distributor).

Figure 3A:
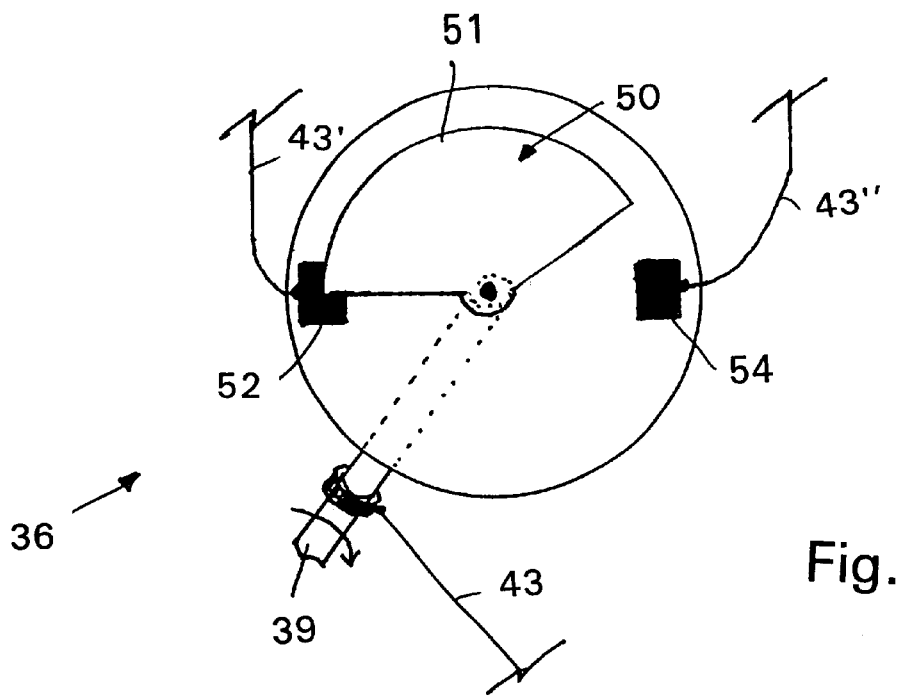
FIG. 3A is a diagrammatic top plan view showing a first modified distributor according to the present invention.

In FIG. 3A, a central shaft 39 of the first modified distributor 36 is supplied with electrical energy, by the input wire 43, from the first battery 40. The wire 43 may be, for example, connected to the shaft via a conductive bushing or the like. The central shaft 39 supports a conductive, lobe-styled rotor 50 which has an arcuate section 51 that extends over an arc of slightly less than 180°, e.g. an arc of between 160° and 178°. The modified distributor 36 supports opposed first and second contacts 52, 54. The first contact 52 is connected by the output line 43' to the first relay 42 while the second contact 54 is connected by the output line 43" to the second relay 42'.

The lobe styled rotor 50 rotates due to the crankshaft 10 rotating in a conventional manner and transmitting such rotational movement to the central shaft 39, in a conventional manner, e.g. via a belt drive as shown in FIG. 1. As it rotates during a first half or portion of its rotational path, the lobe styled rotor 50 contacts one of the two contacts, e.g. the first contact 52, and continuously supplies electrical power, via the wire 43', to the positive relay solenoid input of the first relay 42. Since the negative relay solenoid input of the first relay 42 is grounded, a twelve volt circuit is established across the solenoid relay, and the relay 42 is thrown to a closed position, thereby providing a twenty-four volt connection across one of the pairs of engine solenoids, i.e. solenoids 32.

Once the lobe style rotor 50 has rotated about 180°, the arcuate section 51 breaks contact with the first contact 52 and commences contact with the second contact 54. It is important to note that the contacts are never simultaneously connected. Thereafter, supplied voltage (twelve volts) is continuously supplied, via the wire 43", to the positive relay solenoid input of the second relay 42' as the lobe styled rotor 50 rotates during a second half or portion of its rotational path. This supply of electrical power repeatedly cycles back and forth between the first contact 52 and the second contact 54 as the lobe styled rotor 50 rotates in a single direction at a variable or constant high speed dictated by a conventional speed control device of the engine.

Figure 3B:
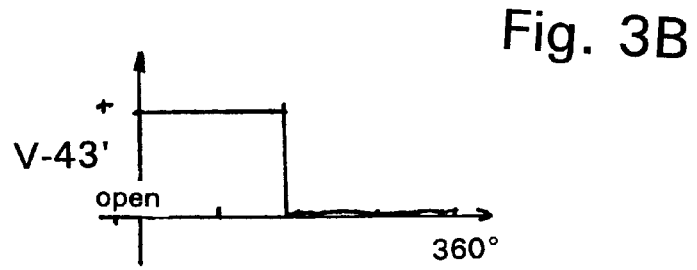
FIGS. 3B and 3C are diagrammatic drawings showing the ON/OFF cycling of the electrical power for the first modified distributor.
Figure 3C:
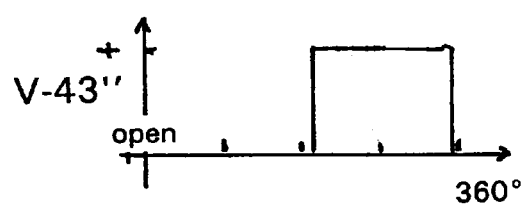

FIG. 3B shows the ON/OFF cycling of the electrical power provided to switch 52 while FIG. 3C shows the cycling of the power supplied to switch 54.

Figure 4A:
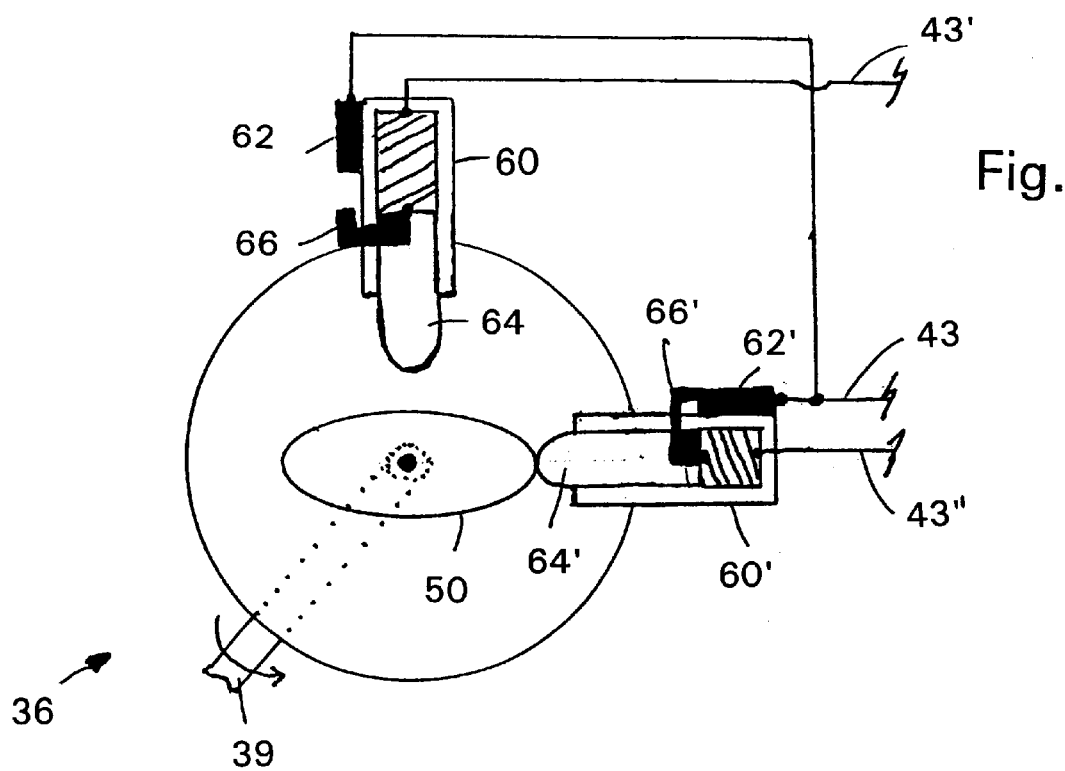
FIG. 4A is a diagrammatic top plan view, partially in cross section, showing a second modified distributor according to the present invention.

FIG. 4A shows a second modified distributor for use in the modified engine of the present invention. As with the distributor of FIG. 3A, a cam or rotor 50 is rotated about its central axis by the input shaft 39 connected to the crankshaft 10. However, here the input line 43 is not connected to the shaft 39, but is instead connected to a first contact 62 of a first normally open spring biased switch 60 and to a first contact 62' of a second normally open spring biased switch 60' (both switches are diagrammatically shown in cross section). The spring biased switches 60, 60' are offset 90° from one another, with an actuator portion 64, 64' of each switch 60, 60' facing inwards towards a center of the distributor 36. The cam 50 is generally elliptical in shape.

In a position as shown in FIG. 4A, the cam 50 is oriented to fully depress the actuator 64' of the second switch 60' against its spring bias means. The first contact 62' is thus in electrical contact with a second contact 66' of the second switch 60'. Since the second contact 66' is electrically connected to the output line 43" (e.g internally through a conductive spring), the supplied twelve volts established on the line 43 is supplied to the output line 43", which is connected to the second relay 42', as shown in FIG. 2. As the cam 50 rotates, the electrical contact established in the second switch 60' is broken. By the time the cam 50 has rotated almost 90°, the first switch 60 is thrown via the first contact 62 coming into contact with the second contact 66. As shown in the accompanying timing scheme, this arrangement is such that each relay 42, 42' is activated for a relatively short period twice per cycle of the cam 50. It is vital that this distributor only be used if the connection between the input shaft 39 and the crankshaft is such that the former rotates only half a cycle (180°) for every full cycle of the crankshaft.

Figure 4B:
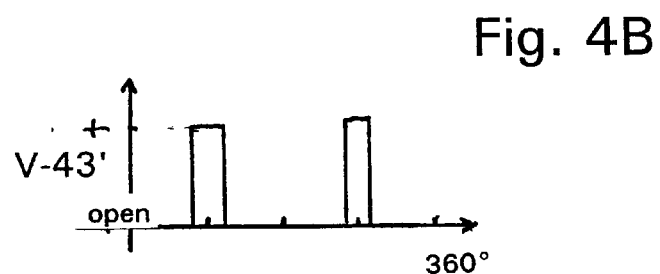
FIGS. 4B and 4C are diagrammatic drawings showing the ON/OFF cycling of the electrical power for the second modified distributor.
Figure 4C:

FIG. 4B shows the cycling of the power supplied to switch 60 while FIG. 4C shows the ON/OFF cycling of the power supplied to switch 60'.

Figure 5A:
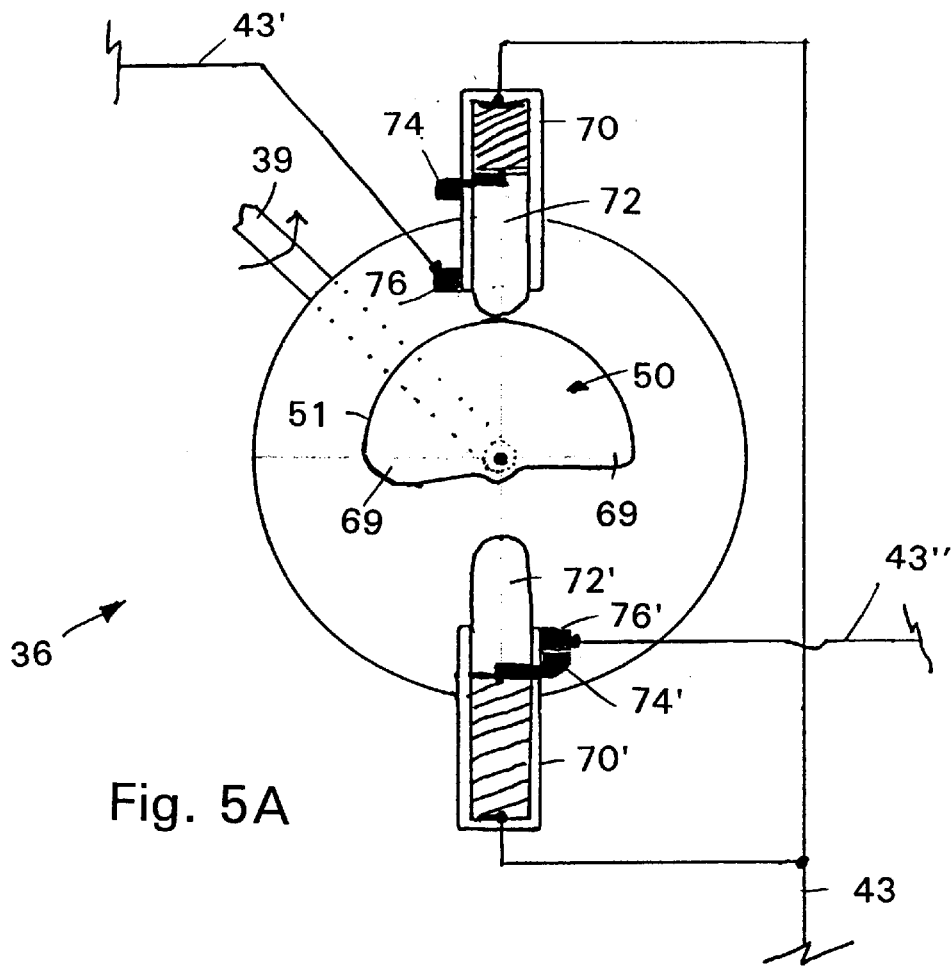
FIG. 5A is a diagrammatic top plan view, partially in cross section, showing a third modified distributor according to the present invention.

FIG. 5A shows a third, alternative modified distributor 36 for use in the present invention. Here again, a central shaft 39 supports a lobe-styled rotor 50 which has an arcuate section 51 that extends over an arc of slightly more than approximately 180°, e.g. an arc of between 182° and 200°. The opposed ends 69 of the rotor 50 are preferably rounded for providing a smooth switch actuation. In addition, a first normally closed spring biased switch 70 is affixed to the distributor with an actuator portion 72 of the switch 70 facing towards a center of the distributor 36. A second, similar switch 70' is affixed to the distributor across (180°) from the first switch 70 (both switches are shown in cross section). A first contact 74, 74' of each switch 70, 70', respectively, is electrically connected to the input line 43 (again, internally through a conductive spring). A second contact 76 of the first switch 70 is electrically connected to the output line 43', while a second contact 76' of the second switch 70' is electrically connected to the output line 43".

Figure 5B:
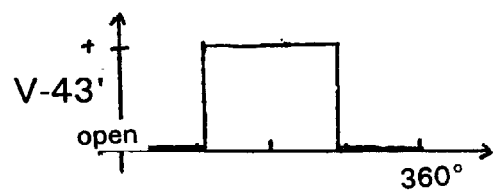
FIGS. 5B and 5C are diagrammatic drawings showing the ON/OFF cycling of the electrical power for the third modified distributor.
Figure 5C:
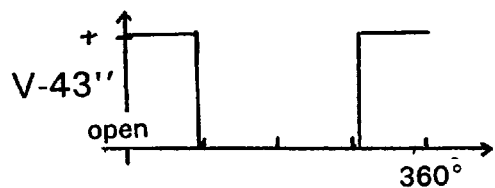

FIG. 5B shows the cycling of the power to switch 70 while FIG. 5C shows the ON/OFF cycling of the power to switch 70'.

This arrangement provides the timing scheme as shown in the Figure, that is, each switch 70, 70' is sequentially thrown for slightly less than half a rotational cycle of the rotor, with the switches never being actuated at the same time. This is similar to the timing scheme of the distributor of FIG. 3A.

The choice of a particular electrical distributor is not crucial to the present invention and any of the aforementioned three distributors may be used. Of course, certain considerations should be taken into consideration when choosing a distributor, for example, that the distributor of FIG. 3A, with its sliding metal parts, may wear out sooner, and that the distributors of FIGS. 4A and 5A are easier to adjust (via, for example, adjusting the spring bias tension or the like.)

Figure 6:
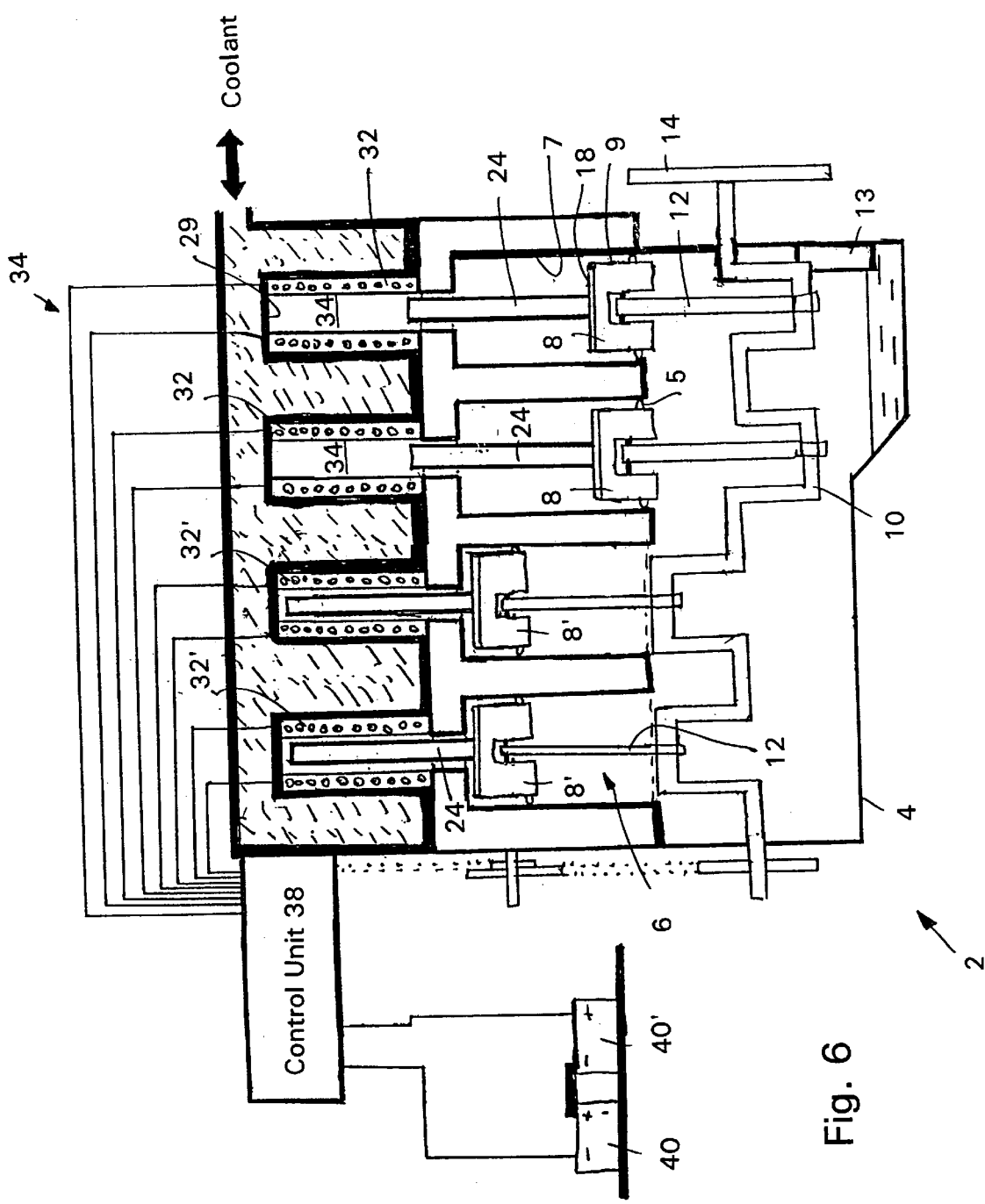
FIG. 6 is a diagrammatic view showing the modified internal combustion engine with the crankshaft rotated 180° relative to the crankshaft position shown in FIG. 1.

As can be seen in FIG. 1, the controller 38 supplies electrical power to the first pair of solenoids 32 (see the two solenoids on the right in FIG. 1) until the associated pistons 8 are at approximately their highest rotational position. At or just before the point when the two pistons 8 achieve their upper most rotational position, the control unit 38 then supplies electrical power to the second pair of solenoids 32' (the two solenoids to the left as can be seen in FIG. 6)—the two associated steel plungers 24 are spaced from the associated central bores 34 of the associated solenoids 32'. The excitation of the second pair of solenoids 32', by the supplied electrical power, swiftly magnetically draws the associated plungers 24 of the pistons 8' completely within the associated central bores 34 of the each of the two solenoid 32'.

Once the second pair of pistons 8' (the two pistons 8' to the left as can be seen in FIG. 6) have reached their upper most rotational or reciprocated position, the electrical power is again switched by the control unit 38 to the first pair of solenoids 32. It is to be appreciated that the first pair of pistons 8 are, due to the supplied rotation of the crankshaft 10 caused by the second pair of piston 8' and solenoids 32', again are located at their lower most position. This procedure repeats numerous time a second to provide rotational driving energy to the crankshaft 10 at the desired rotational speed.

The solenoids 32, 32', when supplied with electrical power, generally produce about 150 pounds of pulling power of the associated piston 8, 8'. The pair of solenoids 32, 32' operate in unison to generate a combined pull of approximately 300 pounds of pulling power which is conveyed to the crankshaft 10, via the associated connection rods 12, to facilitate rotation of the crankshaft 10.

Due to the swift drawing of the steel plungers 24 within the associated solenoids 32, 32' and the precisely timed shut off of the electrical power to either the first pair of solenoids or the second pair of solenoids 32, 32', the generated momentum and/or inertia of the pistons 8, 8' facilitates continued rotation of the piston 8, 8', the crankshaft 10 and the connecting rods 12 in the same rotational direction. This momentum is complemented by the magnetic driving force created by the energized pair of solenoids 32 or 32' and the associated pair of pistons 8 or 8'. This process is repeated hundreds of times a minute to generate the desired rotation torque to the modified electrical engine.

Figure 7A:
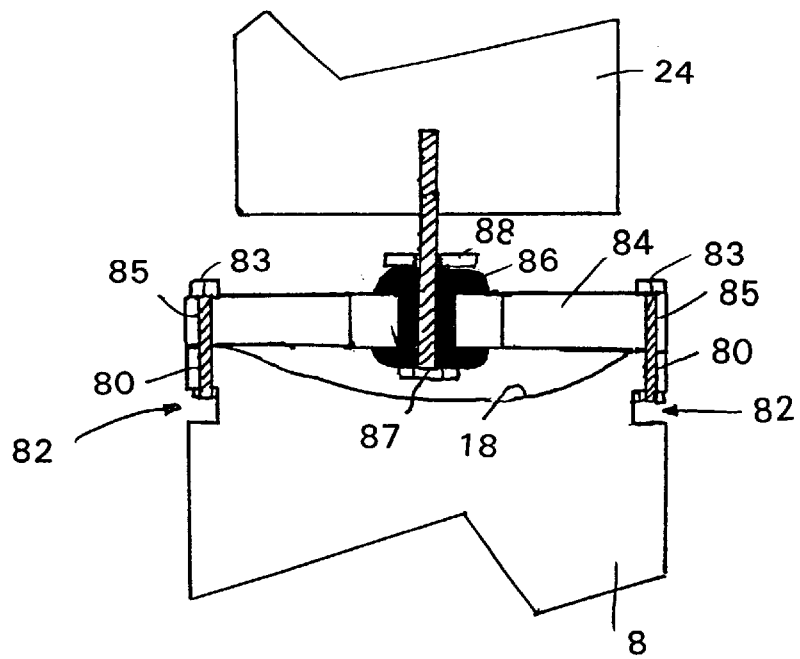
FIG. 7A is a cross-sectional view of a preferred apparatus for attaching a solenoid actuated plunger to a standard concave-topped piston head.
Figure 7B:
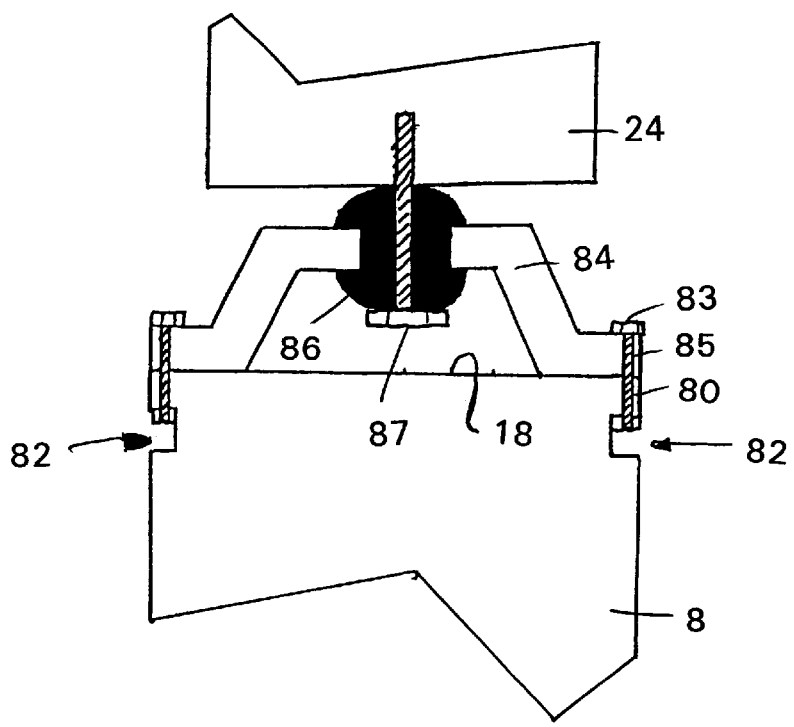
FIG. 7B is a cross-sectional view of a preferred apparatus for attaching a solenoid actuated plunger to a standard flat-topped piston head.

FIGS. 7A and 7B show additional, preferred apparatuses for attaching the plungers 24 to the piston heads 8. Each apparatus allows the plungers to be connected to the piston heads in a self-centering, pivotal manner such that each plunger can move slightly out of axial alignment with its associated piston head. This reduces any potential friction between the plunger 24 and its solenoid bore 34 should the piston head come out of alignment with the solenoid during operation.

In FIG. 7A, the piston head 8 has a concave top surface 18. At least two bores 80 are drilled into the piston head, each bore extending from the top surface 18 (at a location proximate the piston head's edge) through to a circumferential annular compression ring slot 82. The ring slot 82 is already provided in the piston head for previously accommodating the removed annular compression ring, as discussed above. A cross-brace 84 is subsequently placed across the piston head top surface 18 such that its two through holes 85 align with the bores 80. The cross-brace 84 is bolted to the piston head 8 via bolts 83 or some other attachment means inserted through the holes 85 and bores 80.

The cross-brace further includes a gasket 86 disposed in an aperture provided in the center of the cross-brace, and a bolt 87 passing through the gasket 86. The bolt 87 has a threaded connection end for screwing into a mating recess provided in a base of the plunger 24. The gasket 86 should be made from a stiff rubber material or the like such that the bolt 87 is normally self-centered but capable of pivoting or moving slightly off axis. Also, a nut 88 may be provided for securing the elements together, and for ensuring a clearance between the bolt 87 and the piston head top 18. Alternatively, the bolt 87 and associated mating recess in the plunger may be dimensioned so that the bottom surface of the plunger comes into contact with the top of the gasket 86 (as shown in FIG. 7B).

If the piston head is flat-topped, the cross-brace 84 may be raised, as shown in FIG. 7B, for providing a clearance between the brace and the piston head. The other elements are otherwise the same as those shown in FIG. 7A.

Turning now to FIG. 8, the output of the internal combustion engine, e.g. crankshaft 10, is connected to provide rotational drive a DC generator 90 via an input 91 thereof. The rotation of the DC generator 90, by the engine 2, generates electrical energy in a conventional fashion. A first output terminal 92 (i.e. the "+" terminal) of the DC generator 90 is connected in a series to a first terminal 94 of pair of regulators 95 while a second output terminal 92' (i.e. the "−" terminal) of the DC generator 90 is connected in a series to a second terminal 94' of pair of regulators 95. The DC generator 90 and the regulators 95 facilitate charging of the batteries 40, 40' during operation of the internal combustion engine to replenish some of the utilized power. Each regulator 95 is, in turn, coupled to one of the batteries 40, 40', in a conventional fashion, to facilitate recharging of the batteries 40, 40' and replenish some of the expended energy during operation of the internal combustion engine 2. In addition, at least one of the regulators 95 is coupled to a further regulator 96, via wires not separately labeled, and this further regulator 96 is coupled, via wires not separately labeled, to a DC to AC convertor 97. Once the generated electrical power or energy is converted to AC voltage, it can be utilized to power one or more lights 98 or some other desired devices which utilizes AC voltage. As the regulators 95 and 96 and converter 97 are conventional components which are well known in this art, a further detailed description concerning the same is not provided.

As all of the previously described control schemes utilize a mechanical distributor and conventional relays, it should be appreciated that a fully electronic control unit may be used instead. A simplified schematic diagram of one such electronic control unit is shown in FIG. 9.

Figure 9:
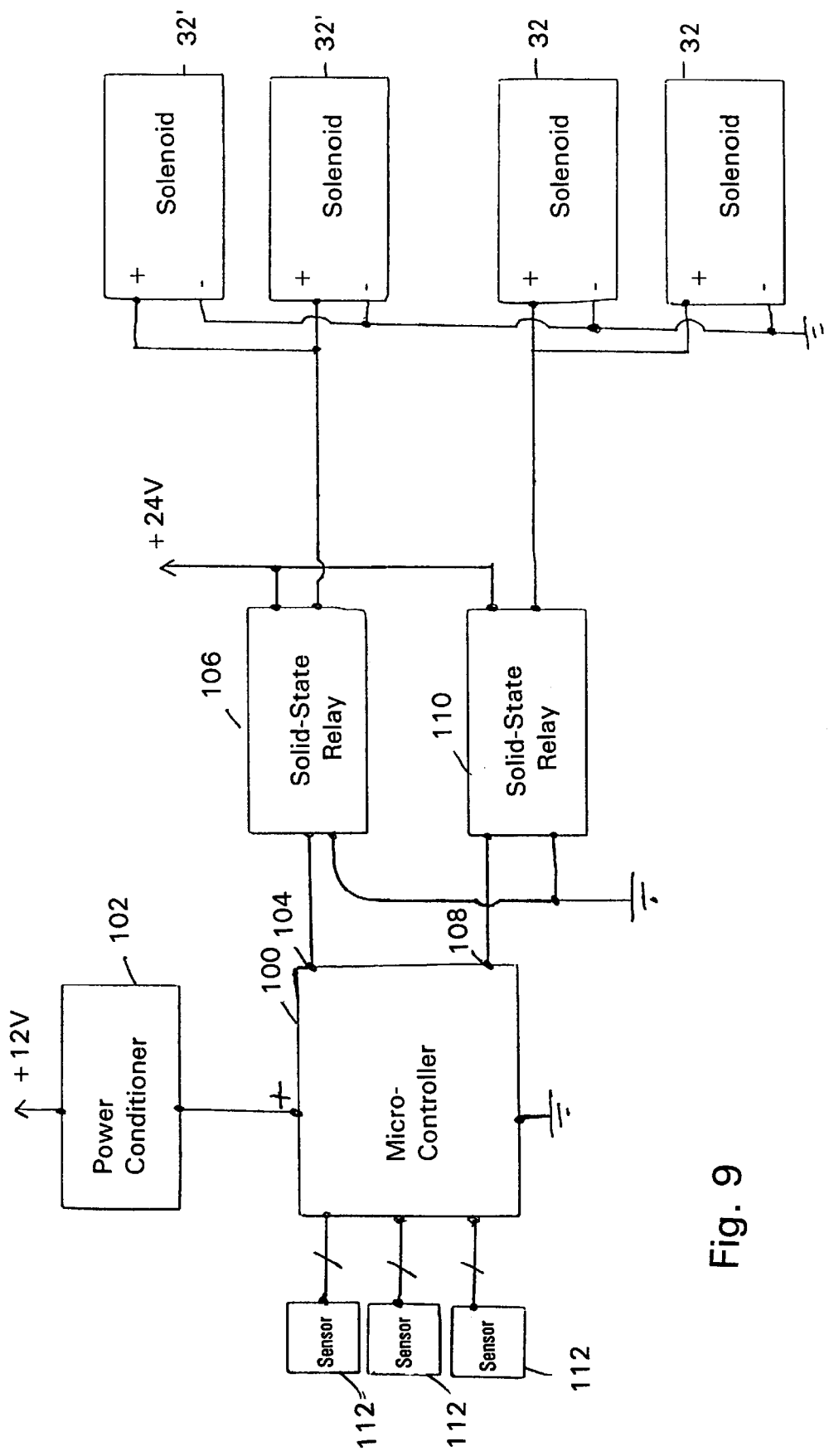
FIG. 9 is a schematic diagram of an electronic control unit circuit for use in co rolling the modified internal combustion engine.

In FIG. 9, a microcontroller 100 is connected between a power conditioning circuit 102 and ground. In this Figure, the batteries 40, 40' are represented as voltage sources for simplicity (+12 V for one battery and +24 V for the batteries in series). The power conditioning circuit 102 may be, for example, a "buck"-type, single quadrant dc-to-dc converter for lowering the 12 volt battery supply to 5 volts or 3 volts (depending on the required input voltage for the microcontroller). It may also be some other type of dc-to-dc power supply, many of which are commonly available. Such a power conditioning circuit is important since ripple currents and the like may be generated in the relatively quick switching engine solenoids.

An output 104 of the microcontroller is connected to a first solid-state relay 106, and a second output 108 of the microcontroller is connected to a second solid-state relay 110. Each solid-state relay comprises a low-power control input isolated from a high power switching output, e.g. via an internal opto-isolator or the like. The solid-state relays are preferably of the kind whose control input is directly actuated via a 3 volt or 5 volt microprocessor output signal, so that, for example, a 5 volt output at the microcontroller output 104 will activate or switch the solid-state relay 106 without any further buffer or level shifting circuits being required. Solid-state relays are advantageous over conventional relays or solenoid actuated switches because they eliminate the possibility of electrical arcing across contacts, and because they typically last longer. Of course, it would still be possible to use conventional relays in this control circuit by providing a suitable buffered switching circuit between the microcontroller outputs and the conventional relays.

As shown further in FIG. 9, a plurality of sensors 112 are electrically connected to a plurality of microcontroller inputs. These sensors may be used to determine various control conditions, such as the position of an accelerator pedal, the position of a brake pedal, and the rotational condition of the crankshaft (rpm's, acceleration, etc.). The provided microcontroller preferably has at least one integrated, internal A/D converter for converting a typically analog sensor signal to a digital form for further processing. Otherwise, it may be necessary to provide a separate A/D converter.

The microcontroller 100 is programmed, in a conventional fashion (e.g. assembly language programs compiled as machine code and burned into an EPROM or EEPROM unit provided integral with the microcontroller, etc.), to utilize the input information provided by the sensors 112 in order to provide a control output to the solid state relays. Thus, for example, the microcontroller can be programed to activate the solid-state relays in succession once during every rotational cycle of the crankshaft, as detected by one of the sensors 112. Then, as determined by the position of the accelerator pedal, for example, the rate of activation can be increased or decreased.

As will be appreciated by those with skill in the art, the implementation of such an electronic control unit, e.g. the exact electronic parts to be used, etc., is a matter of design choice and implementation, and therefore further detail regarding the same will not be provided herein. For example, many self contained microcontrollers incorporating A/D converters and integral EPROM or memory units are commonly available, as are many suitable solid-state relays, sensors, and, as mentioned, power conditioning circuits or power supplies.

It is to be appreciated that the teaching of the present invention is applicable to a conventional in-line four internal combustion engine, as can be seen in FIGS. 1 and 4, for example, as well as to a V-6 internal combustion engine, a V-8 internal combustion engine, and a V-12 internal combustion engine.

Also, one of ordinary skill in the art will appreciate that the arrangement and/or dimensions of the parts of the distributors 36 may be modified or adjusted to provide various timing schemes without departing from the spirit and scope of the invention. One of ordinary skill in the art will also appreciate that the timing scheme of the present invention can be arranged so that the solenoids 32, 32' are activated when the plungers 24 are located fully within the bores 34, thereby providing a magnetic "pushing" action, as opposed a magnetic "pulling" action as described above.

Furthermore, although the present invention has been shown as activating the engine solenoids once per cycle, e.g. either at a point where the plungers are fully within the solenoid bores or substantially outside the solenoid bores, one of ordinary skill in the art will appreciate that the engine solenoids could be activated twice per cycle by switching the polarity of the solenoids at the appropriate times, e.g. to magnetically push the plungers when they are fully received within the solenoid bores and to magnetically pull the plungers when they are substantially without the solenoid bores, without departing from the spirit and scope of the invention.

Also, although the present invention has been illustrated as activating consecutive pairs of engine solenoids, one of ordinary skill in the art will appreciate that any two engine solenoids can be activated as a pair without departing from the spirit and scope of the invention. Also, it should be appreciated that the engine solenoids can be activated sequentially (e.g. not as pairs), simply by providing a four position crankshaft, a four point distributor, four relays, etc.

In addition, although the piston heads and plungers have been illustrated as being connected via a cross-brace having two legs and two connector bores or holes, one of ordinary skill in the art will appreciate a tri-pod or cross-shaped cross-brace could be used to provide a more secure connection between the cross-brace and the piston head without departing from the spirit and scope of the invention.

Also, although the control unit of FIG. 9 has been illustrated as using a stand alone microcontroller, one of ordinary skill in the art will appreciate that a microprocessor could instead be used in conjunction with separate memory devices and separate input/output devices as appropriate (e.g. a computer), without departing from the spirit and scope of the invention.

Since certain changes may be made in the above described engine and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I/we claim:

1. A method of modifying an internal combustion engine, cooled by a common single liquid coolant system, having a plurality of cylindrical bores each housing a movable piston therein, each piston being pivotally coupled, by a connecting rod, to a rotatable crankshaft, and the crankshaft suppling an output of the engine upon combustion occurring within the internal combustion engine, the method comprising the steps of:

removing a cylinder head cover of the engine to provide access to each of the pistons;

mounting a steel plunger to an end face of each one of the pistons located within a cylinder bore by:

pre-connecting the steel plunger to a cross brace;

drilling at least two through-bores in the piston head;

attaching the cross brace to the piston head using at least two fasteners passed through the at least two through-bores to join the cross brace and piston head;

attaching a modified cylinder head cover having an extended cylinder bore accommodating a solenoid therein, and each solenoid having a central bore for receiving therein one of the mounted steel plungers when each associated solenoid is energized with electrical power; and supplying, via a control member, electrical energy to the solenoids, in a desired sequence, to cause each associated steel plunger to be received within the central bore of the associated solenoid and thereby induce rotational driving of the crankshaft.

2. A method of modifying an internal combustion engine having a plurality of cylindrical bores each housing a movable piston therein, each piston being pivotally coupled, by a connecting rod, to a rotatable crankshaft, and the crankshaft suppling an output of the engine, the method comprising the steps of:

removing a cylinder head cover of the engine to provide access to the pistons;

removing an annular compression ring from each one of the pistons while leaving oil rings on the pistons to facilitate lubricated movement of the pistons within the cylinder bore;

mounting a steel plunger to an end face of each one of the pistons located within a cylinder bore by:

drilling at least two through-bores in the piston head with the bores extending from a top surface of the piston head, adjacent a perimeter edge thereof, through to a ring slot in the piston head;

attaching a cross brace to the piston head with the cross brace having a centrally located, self-centering bolt extending up therefrom; and connecting the steel plunger to the cross brace via the up-standing, self-centering bolt;

attaching a modified cylinder head cover which has a solenoid located within each extended cylinder bore of the modified cylinder head cover, and each solenoid having a central bore for receiving therein one of the mounted steel plungers when an associated solenoid is energized with electrical power; and providing a powered control unit for supplying electrical energy to the solenoids according to a timing scheme in order to cause each associated steel plunger to move within the central bore of the associated solenoid, thereby causing rotational drive of the crankshaft.

3. The method according to claim 2, further comprising the steps of the control unit simultaneously energizing a first pair of the solenoids while simultaneously de-energizing a second pair of the solenoids and thereafter simultaneously de-energizing the first pair of the solenoids while simultaneously energizing the second pair of the solenoids.

4. The method according to claim 3, further comprising the steps of sequentially energizing and de-energizing the first and the second pair of the solenoids via the control member numerous times per minute to generate the desired rotation of the crankshaft.

5. The method according to claim 4, further comprising the steps of utilizing a distributor as the control unit and supplying electrical power to the distributor, via a pair of 12 volt batteries connected in series, to generate 24-volts of electrical power, and rotating a rotor of the distributor to sequentially energize and de-energize the first and the second pair of the solenoids.

6. The method according to claim 5, further comprising the steps of supporting a lobe styled rotor on a central shaft of the distributor and providing the distributor with a first contact and a second contact such that rotation of the lobe styled rotor sequentially engages a desired one of the first and second contacts whereby, during a first half of rotation of the lobe style rotor, the first contact is engaged by the lobe style rotor to facilitate supplying the electrical power to the first pair of the solenoids and, during a second half of rotation of the lobe style rotor, the second contact is engaged by the lobe style rotor to facilitate supplying the electrical power to the second pair of the solenoids.

7. The method according to claim 6, further comprising the step of rotating the rotor by coupling the rotor to the crankshaft.

8. The method according to claim 6, further comprising the step of electrically connecting a relay between the distributor and each of the first and second plurality of solenoids, and rotating the distributor to sequentially energize the relays which, in turn, supply electrical power to the desired first and second plurality of solenoids.

9. The method according to claim 6, further comprising the step of providing the distributor with first and second normally closed spring biased switches, supporting a lobe styled rotor on a central shaft of the distributor, and rotating the rotor to actuate, and thereby open, the first normally closed spring biased switch, during a first portion of rotation of the lobe style rotor, while the second normally closed switch is closed, and, during a second portion of rotation of the lobe style rotor, the rotor thereby opens the second normally closed spring biased switch while the first normally closed switch is closed.

10. The method according to claim 4, further comprising the steps of providing the modified cylinder head cover with at least one coolant cavity, located in fluid communication with the solenoids, supplying a coolant to the at least one coolant cavity to sufficiently cool the solenoids during operation of the electrical engine.

11. The method according to claim 2, further comprising the steps of removing an annular compression ring from each one of the pistons while leaving oil rings on the pistons to facilitate lubricated movement of the pistons within the cylinder bore.

12. The method according to claim 2, further comprising the step of repeatedly sequentially energizing and de-energizing, via the control unit, a first and a second plurality of solenoids to provide the rotational drive of the crankshaft.

13. The method according to claim 12, further comprising the step of utilizing a distributor, electrically connected between a power source and the first and second plurality of solenoids, as the control unit and rotating a rotor of the distributor to sequentially simultaneously energize and de-energize the first and plurality of solenoids.

14. The method according to claim 12, further comprising the step of energizing the first plurality of solenoids, via the control unit, at a rotational point where the respective steel plungers of the first plurality of solenoids are substantially displaced at a maximum distance from the central bores of the associated solenoids, for magnetically pulling the steel plungers into the associated central bores, and de-energizing a second plurality of solenoids, via the control unit, at a rotational point where the respective steel plungers of the second plurality of solenoids are substantially entirely received within the central bores of the associated solenoids, for allowing the steel plungers into the associated central bores to be freely removed therefrom.

* * * * *